(12) United States Patent
Kikuchi et al.

(10) Patent No.: US 6,880,666 B2
(45) Date of Patent: Apr. 19, 2005

(54) AUTOMOTIVE OUTBOARD AIR BAG SYSTEM

(75) Inventors: Yuji Kikuchi, Wako (JP); Yutaka Okamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 32 days.

(21) Appl. No.: 10/405,520

(22) Filed: Apr. 2, 2003

(65) Prior Publication Data

US 2003/0192731 A1 Oct. 16, 2003

(30) Foreign Application Priority Data

Apr. 12, 2002 (JP) ...................................... 2002-110322

(51) Int. Cl.[7] .............................................. B60K 28/14
(52) U.S. Cl. .................. 180/274; 280/730.1; 280/743.2
(58) Field of Search ................................ 180/271, 274; 280/730.1, 743.2; B60R 21/34

(56) References Cited

U.S. PATENT DOCUMENTS

| | | | | |
|---|---|---|---|---|
| 5,636,862 | A | * | 6/1997 | Cheung et al. .......... 280/743.2 |
| 5,730,464 | A | * | 3/1998 | Hill .......................... 280/743.2 |
| 6,182,782 | B1 | * | 2/2001 | Matsuura et al. ........... 180/274 |
| 6,315,323 | B1 | * | 11/2001 | Pack, Jr. .................. 280/743.2 |
| 6,334,627 | B1 | * | 1/2002 | Heym et al. ............. 280/743.2 |
| 6,474,679 | B1 | * | 11/2002 | Miyasaka et al. ........... 180/274 |
| 6,502,858 | B1 | * | 1/2003 | Amamori .................. 280/743.2 |
| 6,536,800 | B1 | * | 3/2003 | Kumagai et al. ......... 280/730.1 |
| 6,808,198 | B1 | * | 10/2004 | Schneider et al. ....... 280/730.1 |

FOREIGN PATENT DOCUMENTS

| | | | | |
|---|---|---|---|---|
| DE | 10014832 A | * | 10/2001 | ........... B60R/21/34 |
| JP | 07-108903 | | 4/1995 | |

* cited by examiner

Primary Examiner—Paul N. Dickson
Assistant Examiner—Joselynn Y. Sliteris
(74) Attorney, Agent, or Firm—Merchant & Gould P.C.

(57) ABSTRACT

An automotive outboard air bag system (30) is provided in which an elongate tubular air bag (33) is inflated to deploy upwardly from the vicinity of a front pillar lower end portion (18a), the air bag so inflated to deploy is made to extend along an outer surface (18b) of a front pillar (18), and a strap (35) which is shorter than the overall length (L2) of the air bag (33) is allowed to extend from an upper end (33b) to a lower end (33a) of the air bag (33) so as to face the outer surface (18b) of the front pillar (18).

8 Claims, 7 Drawing Sheets

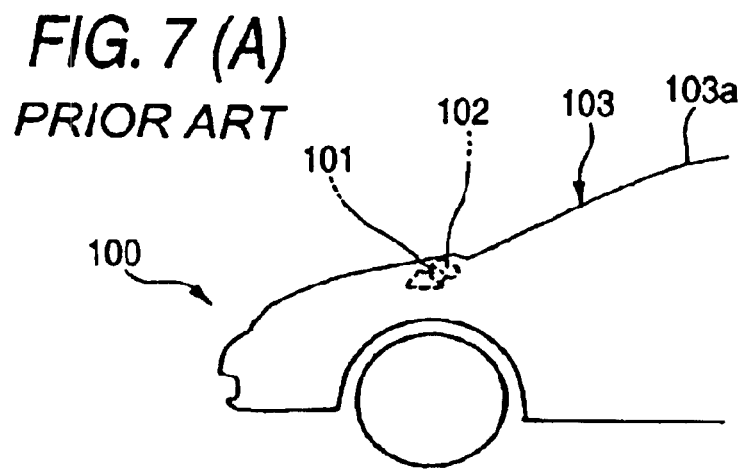
FIG. 7 (A) PRIOR ART
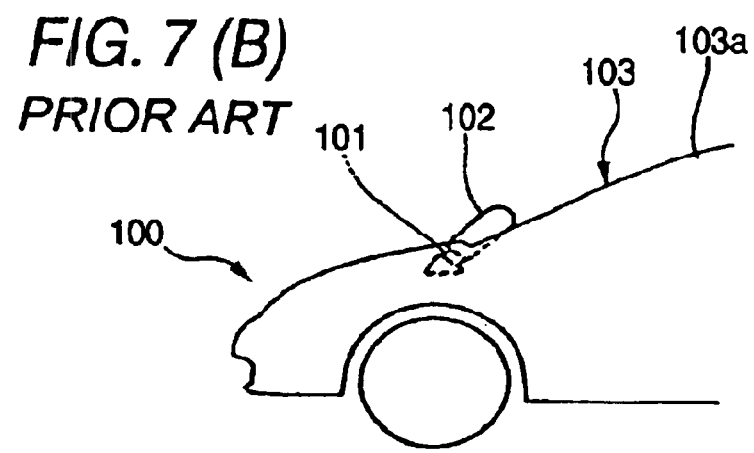
FIG. 7 (B) PRIOR ART
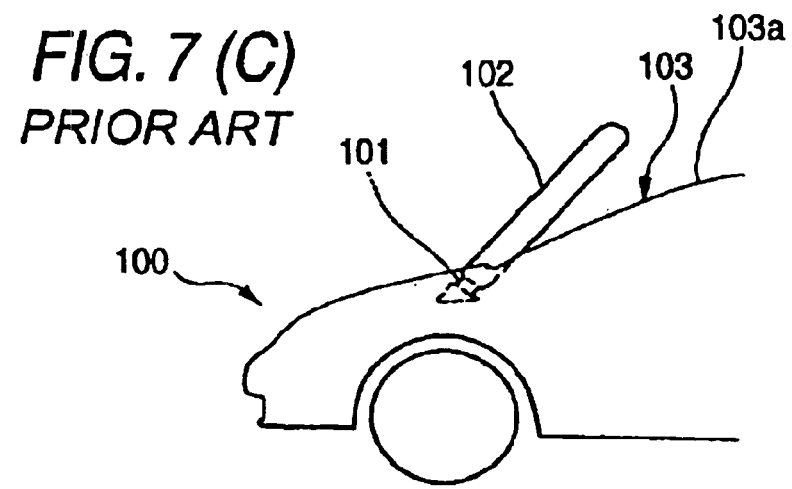
FIG. 7 (C) PRIOR ART

AUTOMOTIVE OUTBOARD AIR BAG SYSTEM

BACKGROUND OF THE INVENTION

1. Field of the Invention

The present invention relates to an automotive outboard air bag system for relaxing an impact exerted on an object by inflating and deploying an air bag in case a vehicle should collide with the object.

2. Description of the Related Art

JP-A-7-108903 entitled a "pillar air bag system" proposes an automotive outboard air bag system for relaxing an impact exerted on an object by deploying an air bag outwardly of the vehicle in case a vehicle should collide with the object. A common example of an automotive outboard air bag system of this type will be illustrated in the following drawings.

FIGS. 7A to 7C are explanatory views showing a common example of a conventional automotive outboard air bag system.

In FIG. 7A, in case a vehicle 100 should collide against an object, an impact generated in the vehicle is detected by an impact detection sensor (not shown), and an inflator 101 is actuated based on a detection signal from the impact detection sensor.

In FIG. 7B, gas is generated by the inflator 101, and an air bag 102 is filled with the gas so generated. Then, the air bag 102 is inflated, and the inflating air bag 102 presses against a lid (not shown) which closes an opening above the air bag 102.

The lid is broken at a breakable portion by virtue of the inflating force of the air bag 102, which is then caused to inflate and deploy upwardly along an outer surface of a front pillar 103.

In FIG. 7C, the outer surface of the front pillar 103 is covered with the air bag 102 when the air bag 102 inflates and deploys upwardly to an upper end 103a of the front pillar 103, whereby the impact exerted on the colliding object is absorbed by the air bag 102.

Here, in order to allow the impact exerted on the colliding object to be absorbed by the air bag 102 efficiently, the air bag 102 is preferably allowed to inflate and deploy along the front pillar 103 and a windshield.

Then, in order to allow the air bag to inflate and deploy along the front pillar 103 and the windshield, the air bag 102 needs to be positioned close to the front pillar 103 and the windshield.

In the event that the air bag 102 is inflated to deploy while it is positioned close to the front pillar 103 and the windshield, however, there may be caused a possibility, for example, that the air bag 102 comes into contact with the outer surfaces of the front pillar 103 and the windshield in the course of inflation and deployment thereof.

Then, in the event that the air bag 102 comes into contact with the outer surfaces of the front pillar 103 and the windshield while the air bag 102 is being inflated to deploy, there may be caused a possibility that the air bag 102 is inclined forward to thereby go away from the outer surfaces of the front pillar 103 and the windshield.

SUMMARY OF THE INVENTION

Thus, an object of the invention is to provide an automotive outboard air bag system which can allow an air bag to inflate and deploy along the outer surface of a vehicle.

With a view to attaining the object, according to an aspect of the invention, there is provided an automotive outboard air bag system including: an elongate tubular air bag operable to be inflated to deploy upwardly from the vicinity of a lower end portion of a front pillar along an outer surface of the front pillar; and a strap being shorter than the overall length of the air bag and extending from an upper end to a lower end of the air bag in such a manner as to face the outer surface of the front pillar.

By providing the strap which is shorter than the overall length of the air bag to extend the upper end to the lower end of the air bag, when the air bag is inflated to deploy the inflation and deployment of the air bag is restrained by the strap so that the air bag can be bent in a curved fashion.

In addition, by providing the strap in such a manner as to face the outer surface of the front pillar, the air bag can be bent so as to approach the outer surface of the front pillar.

BRIEF DESCRIPTION OF THE DRAWINGS

FIGS. 7A to 7C are explanatory views showing a common example of a conventional automotive outboard air bag system.

DETAILED DESCRIPTION OF THE PREFERRED EMBODIMENTS

Figure 1:
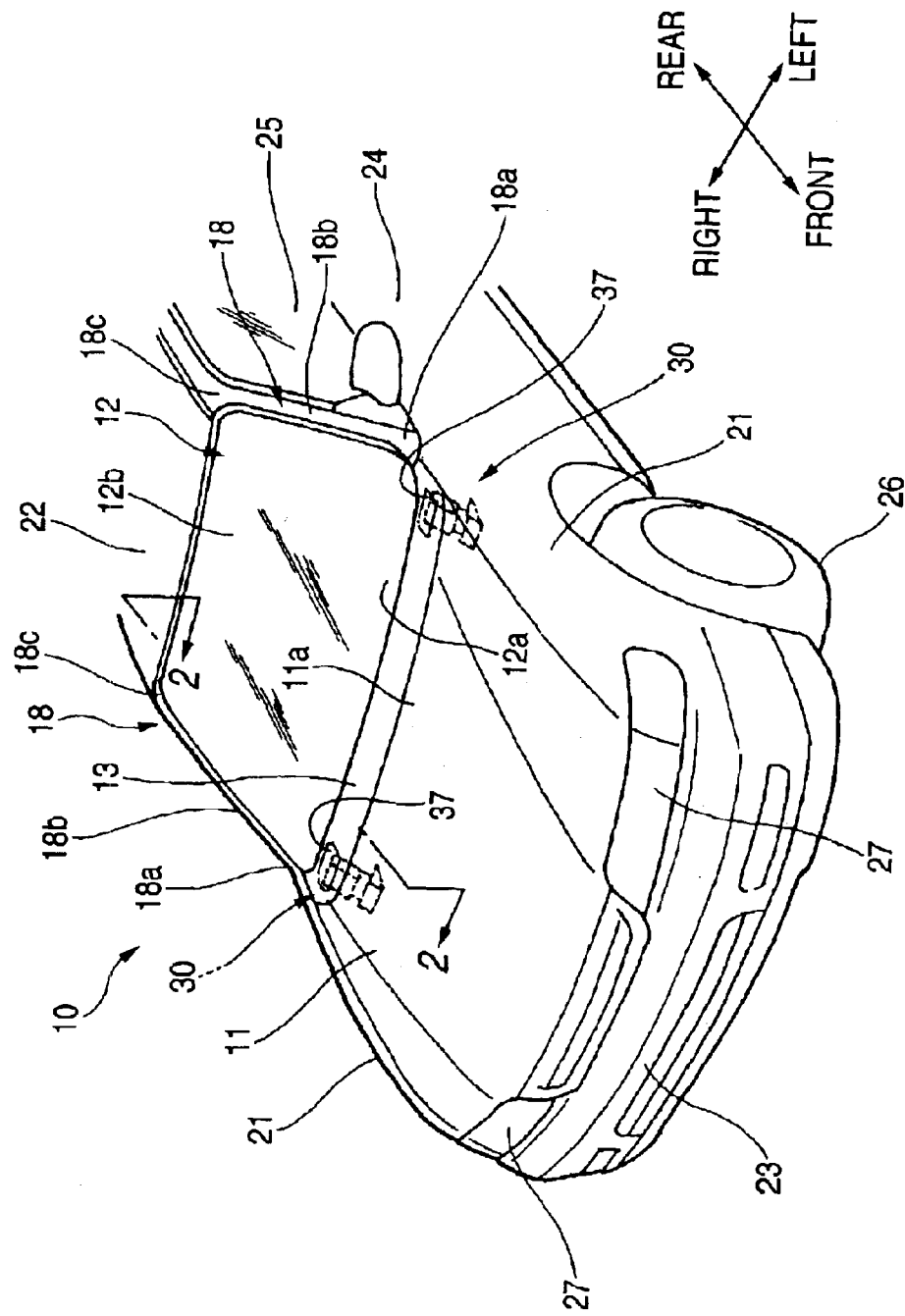
FIG. 1 is a perspective view of a vehicle equipped with an automotive outboard air bag system (a first embodiment) according to the invention.

Embodiments of the invention will be described below based on the accompanying drawings. Here, "front", "rear", "left" and "right" means such directions, respectively, as viewed from the driver. Note that the drawings are viewed in a direction in which reference numerals are shown.

FIG. 1 is a perspective view of a vehicle equipped with automotive outboard air bag systems (a first embodiment) according to the invention.

The vehicle 10 includes a cowl 13 provided in the vicinity of a rear end 11a of a bonnet 11 on a lower end portion 12a side of a windshield 12, and left and right automotive outboard air bag systems 30, 30 provided in the vicinity of lower end portions 18a, 18a of left and right front pillars, respectively, in the interior of the cowl 13.

In the figure, reference numeral 21 denotes left and right front fenders, reference numeral 22 a roof, reference numeral 23 a front bumper, reference numeral 24 a front side door, reference numeral 25 a window glass of the front side door, reference numeral 26 a front wheel, and reference numeral 27 a headlamp.

Note that since the left-side automotive outboard air bag system 30 is an identical member to the right-side automotive outboard air bag system 30, the following description will be made only with respect to the right-side automotive outboard air bag system 30 and hence the description of the left-side automotive outboard air bag system 30 will be omitted.

Figure 2:
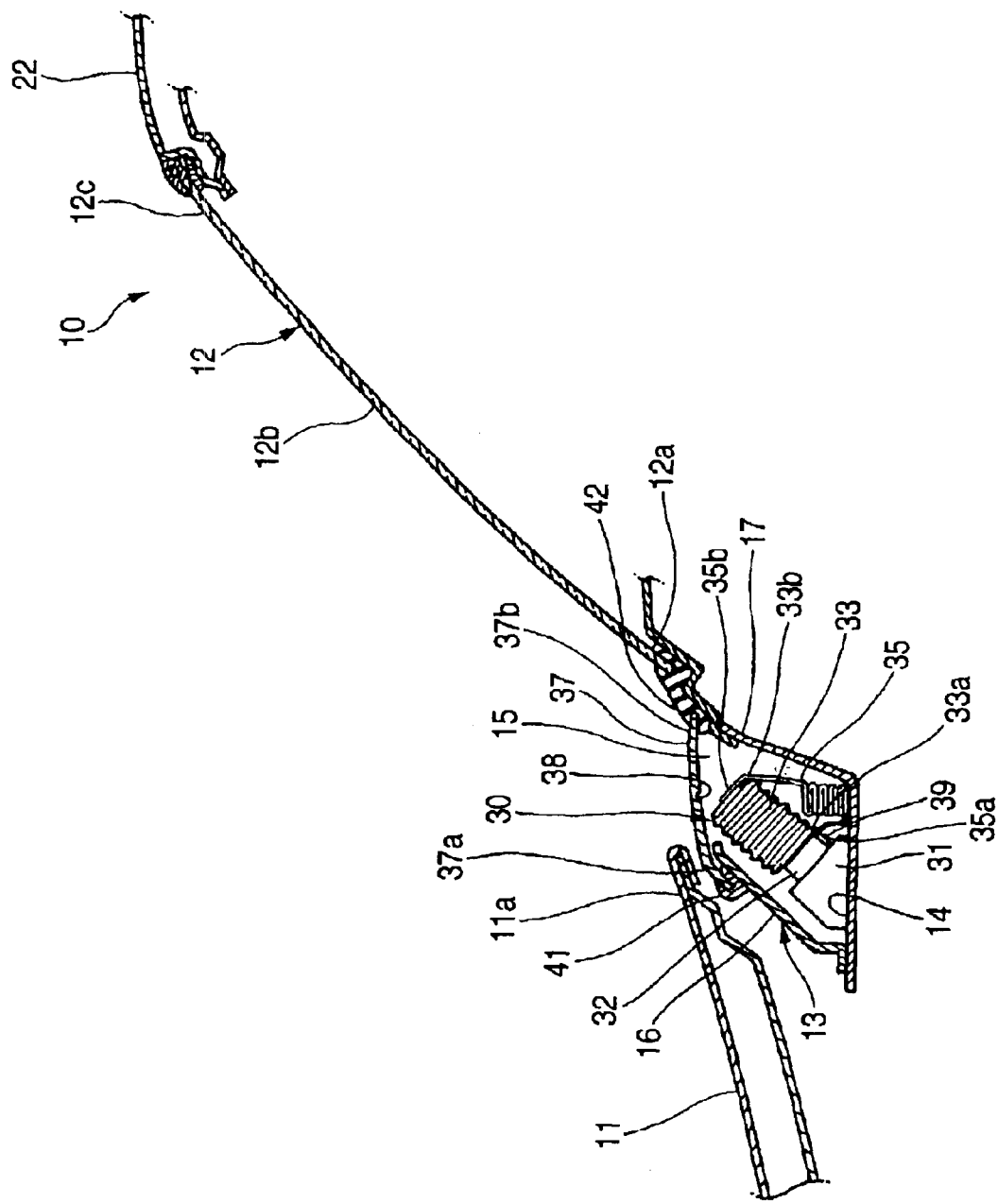
FIG. 2 is a sectional view taken along the line 2—2 in FIG. 1.

FIG. 2 is a sectional view taken along the line 2—2 in FIG. 1 which shows a condition in which the automotive outboard air bag system is accommodated in the interior of the cowl.

The automotive outboard air bag system 30 is constructed such that a base 31 is provided on a bottom portion 14 of the cowl 13, an inflator 32 is attached to an upper end of the base 31, an air bag 33 is attached to the inflator 32, a lower end portion 35a of a strap 35 is attached to the inflator 32 disposed on a lower end portion 33a side of the air bag 33 via a rivet 39, an upper end portion 35b of the strap 35 is connected to an upper end portion 33b of the air bag 33, an opening 15 in the cowl 13 is closed with a lid 37, and a breakable groove 38 is formed in the lid 37 so that the lid 37 is broken thereat.

As shown in FIG. 1, the lid 37 is a lid body formed substantially into a rectangular shape which is disposed above the upper end portion 33b of the air bag 33 and is a member which is attached to an upper end of a front wall 16 of the cowl 13 at a front end 37a thereof with a sealing compound 41 and to an upper end of a rear wall 17 of the cowl 13 at a rear end 37b thereof with a sealing compound 42.

By forming the breakable groove 38 in the lid 37 substantially at a center thereof, when the air bag 33 is inflated to deploy, the upper end portion 33b of the air bag 33 is pressed against a back of the lid 37, and when the air bag 33 is inflated to deploy further from this condition, the air bag 33 is allowed to be broken from the breakable groove 38 with the inflating and deploying force of the air bag 33.

Figure 3:
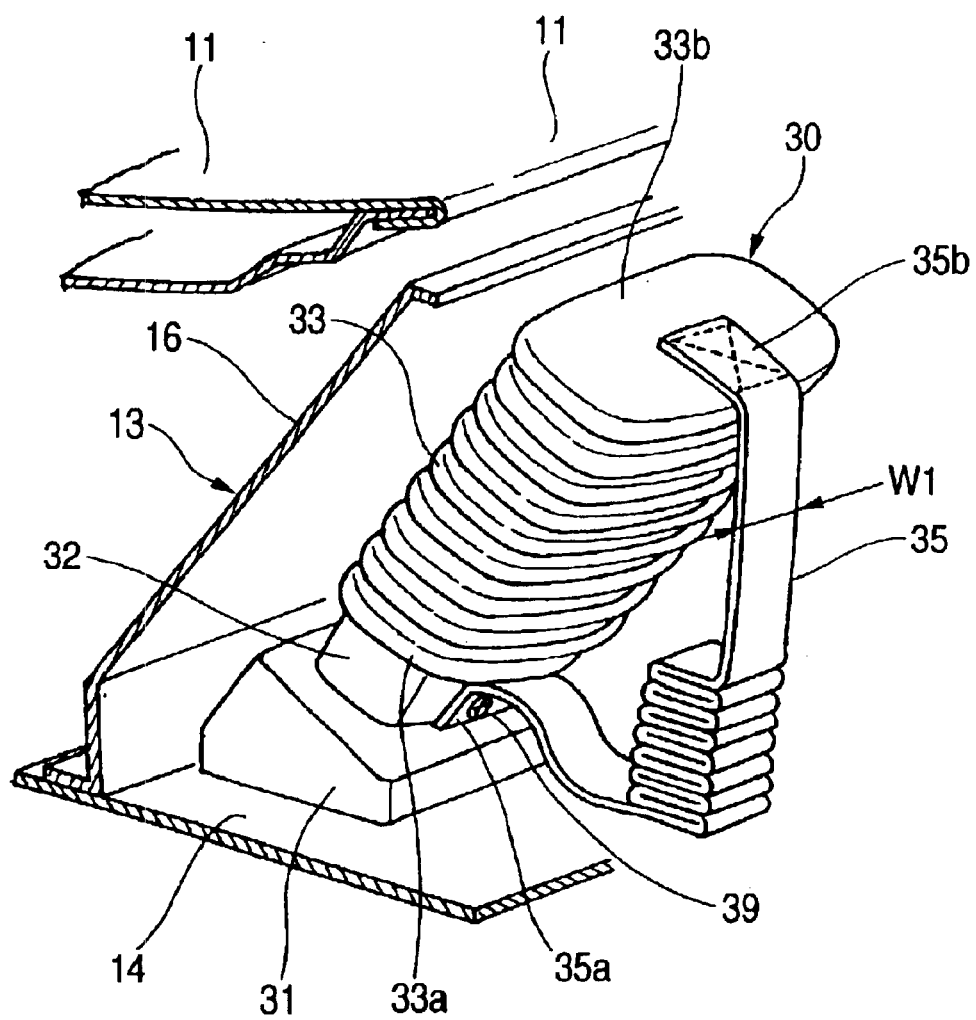
FIG. 3 is a perspective view showing the automotive outboard air bag system (the first embodiment) according to the invention.

FIG. 3 is a perspective view showing the automotive outboard air bag system (the first embodiment) according to the invention. Note that the illustrated automotive outboard air bag system 30 exemplifies a common system and therefore the construction and shape of the automotive outboard air bag system is not limited to what is illustrated in the figure.

The strap 35 of the automotive outboard air bag system 30 is a flexible belt-like strap made of, for example, a fabric base or rubber and is set so as to have a strap width W1 and a strap length L1 (shown in FIG. 4B).

The strap length L1 of the strap 35 is set to be slightly shorter than the overall length L2 (shown in FIG. 4B) of the air bag 33 when inflated and deployed.

In addition, the strap 35 is disposed so as to face an outer surface 18b of the front pillar 18 and an outer surface 12b of the windshield 12, which are shown in FIG. 1, when the air bag 33 is inflated to deploy.

In the condition in which the air bag 33 is accommodated within the cowl 13 as shown, the strap 35 is accommodated within the cowl 13 in a folded condition.

While the embodiment shown in FIG. 3 is illustrated as an example in which the air bag 33 and the strap 35 are folded separately for compact arrangement so that the individual members 33, 35 are accommodated within the cowl 13, it is possible as another accommodating example to fold the air bag 33 and the strap 35 together for compact arrangement for accommodation thereof within the cowl 13.

Thus, by folding the air bag 33 and the strap 35 together, the air bag 33 and the strap 35 can be arranged so that the strap 35 is not separated apart from the air bag 33 as shown in FIG. 3.

According to this construction, the air bag 33 and the strap 35 can be arranged more compact to there by attempt to decrease the accommodating space.

Note that the ground will be described in detail in FIG. 5 for providing the strap 35 which is shorter than the overall length L2 of the air bag 33 to extend from the upper end portion 33b to a lower end portion 33a of the air bag 33 so as to face the outer surface 18b of the front pillar 18 and the outer surface 12b of the windshield 12.

Figure 4:
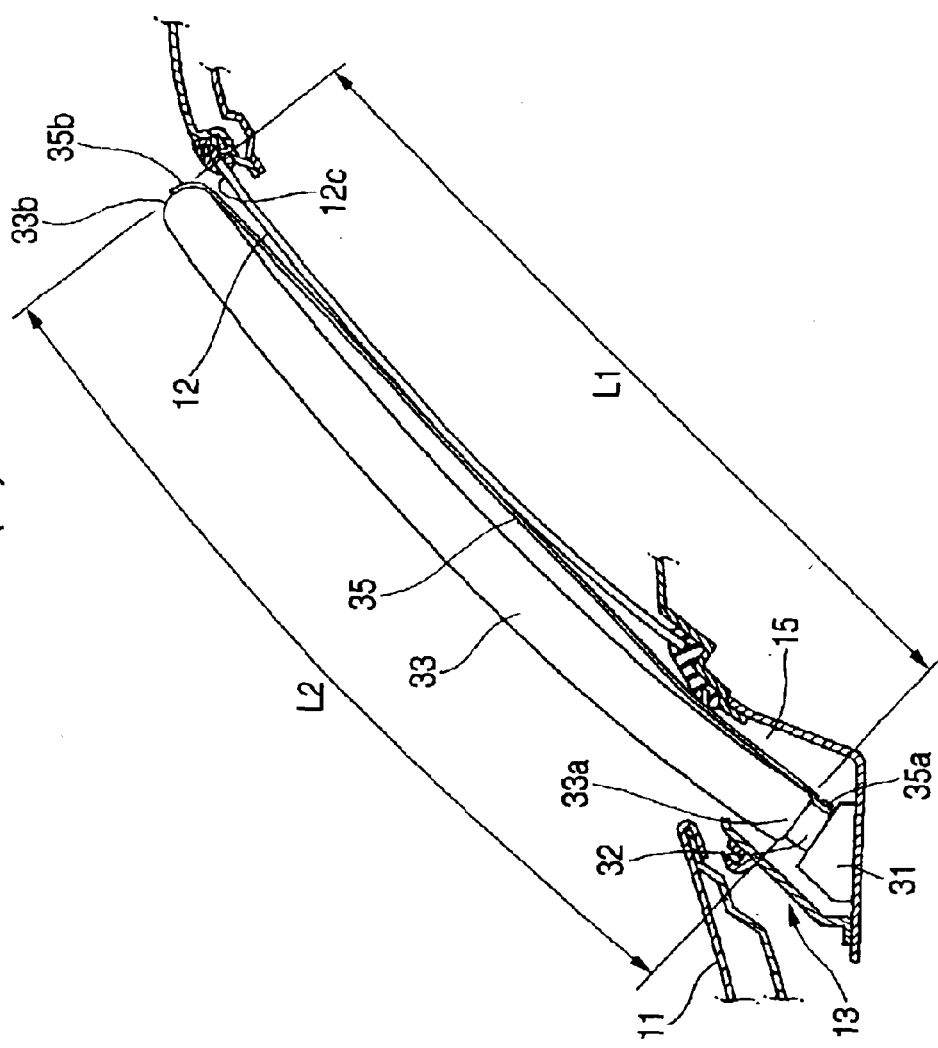
FIGS. 4A and 4B are first explanatory views explaining a function of the automotive outboard air bag system (the first embodiment) according to the invention.
Figure 4:
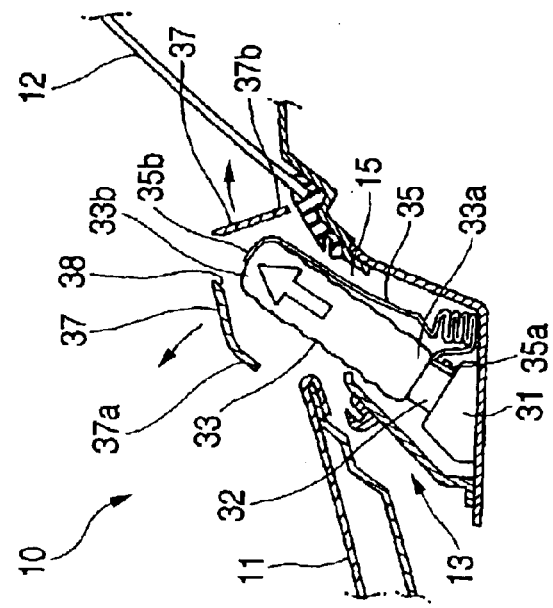

Next, functions of the automotive outboard air bag system 30 will be described based on FIGS. 4A to 5.

FIGS. 4A, 4B are first explanatory views explaining a function of the automotive outboard air bag system (the first embodiment) according to the invention.

In FIG. 4A, in the event that the vehicle 10 collides against an object (not shown), an impact generated in the vehicle 10 is detected by an impact detection sensor (not shown), and the inflator 32 is actuated based on a detection signal from the impact detection sensor.

Gas is generated in the inflator 32, and the gas so generated is fed into the air bag 33 to fill the bag. The air bag 33 is inflated to deploy and is then pressed against the lid 37, and the breakable groove 38 in the lid 37 is broken with the inflating and deploying force of the air bag 33.

Thus, the lid 37 is separated apart from the center thereof and is then removed from the opening 15 of the cowl 13 as indicated by arrows, whereby the air bag is allowed to be inflated to deploy upwardly from the opening 15 of the cowl 13.

As this occurs, since an upper end portion 35b of the strap 35 protrudes upwardly together with the upper end portion 33b of the air bag 33, a condition is produced in which the folded portion of the strap 33 is extended.

In FIG. 4B, when the gas generated within the inflator 32 is fed further into the air bag 33 so as to fill the bag, the air bag 33 is inflated further to deploy to an upper end portion 18c of the front pillar 18 (shown in FIG. 1) and an upper end portion 12c of the windshield 12.

Figure 5:
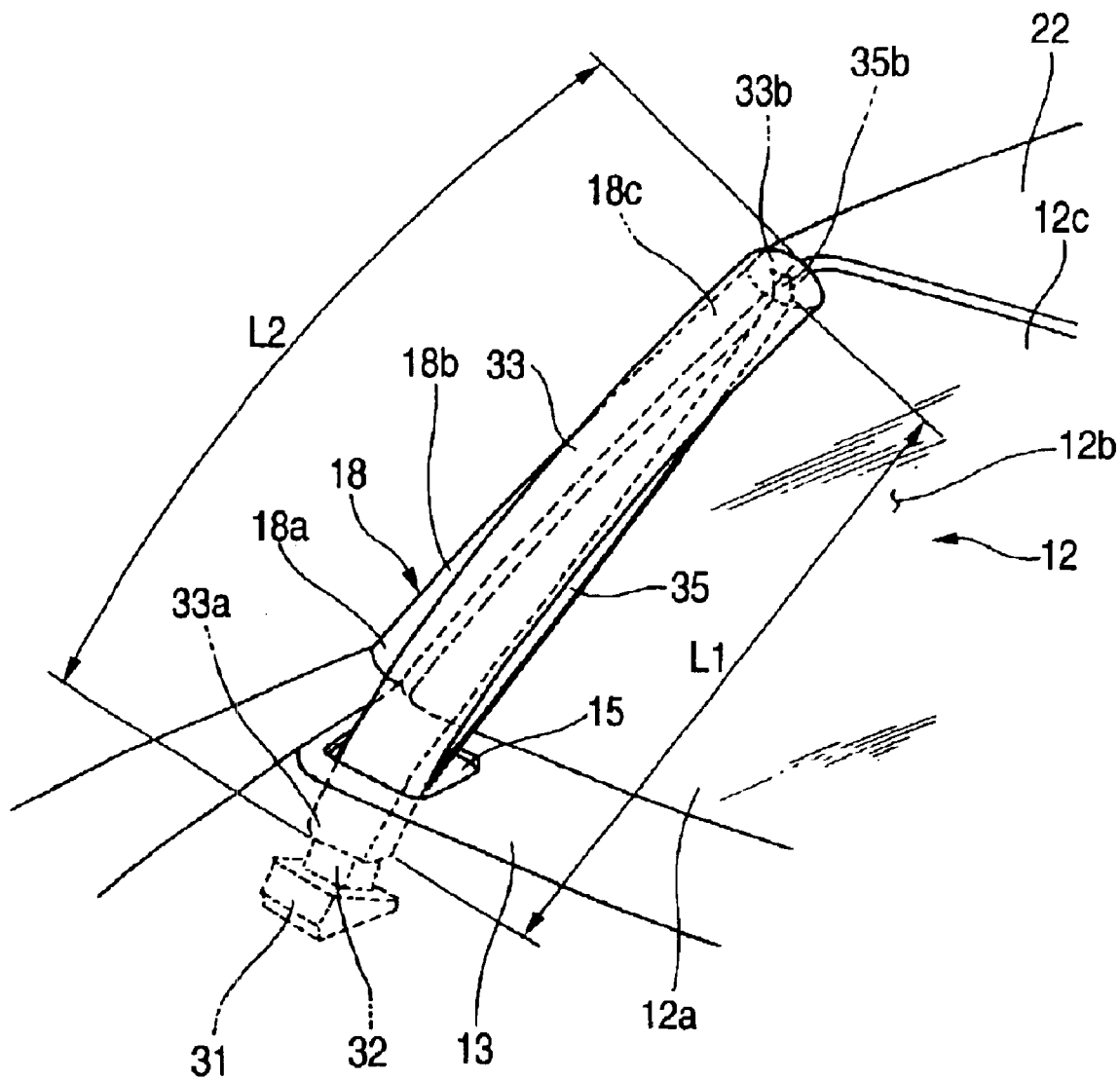
FIG. 5 is a second explanatory view explaining another function of the automotive outboard air bag system (the first embodiment) according to the invention.

FIG. 5 is a second explanatory view explaining another function of the automotive outboard air bag system (the first embodiment) according to the invention.

The overall length L2 of the air bag 33 (shown in FIG. 4A) becomes slightly longer than the overall length L1 of the strap 35 (shown in FIG. 4A) when the air bag 33 completes the inflation and deployment thereof, whereby the inflation and deployment of the air bag is restrained by the strap 35 so that the air bag 33 can be bent in a curved fashion.

In addition, the strap 35 is disposed at the position which faces the outer surface 18b of the front pillar 18 and the outer surface 12b of the windshield, whereby the air bag can be bent in the curved fashion so as to approach the outer surface 18b of the front pillar 18 and the outer surface 12b of the windshield 12.

Accordingly, the air bag 33 can be inflated and deployed along the outer surface of the vehicle 10, in particular, the outer surface 18b of the front pillar 18 and the outer surface 12b of the windshield 12 (the window glass).

Next, second and third embodiments of the invention will be described based on FIGS. 6A, 6B. Note that like reference numerals are imparted to some of constituent members of the second and third embodiments which are like to those of the automotive outboard air bag system of the first embodiment, and the description thereof will be omitted.

Figure 6:
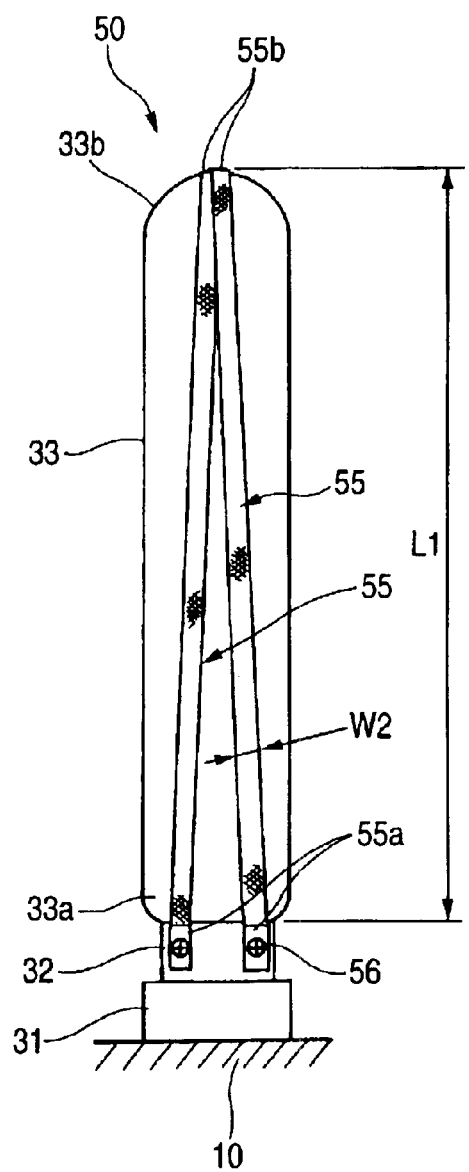
FIGS. 6A and 6B are side views showing other embodiments of automotive outboard air bag systems according to the invention.
Figure 6:
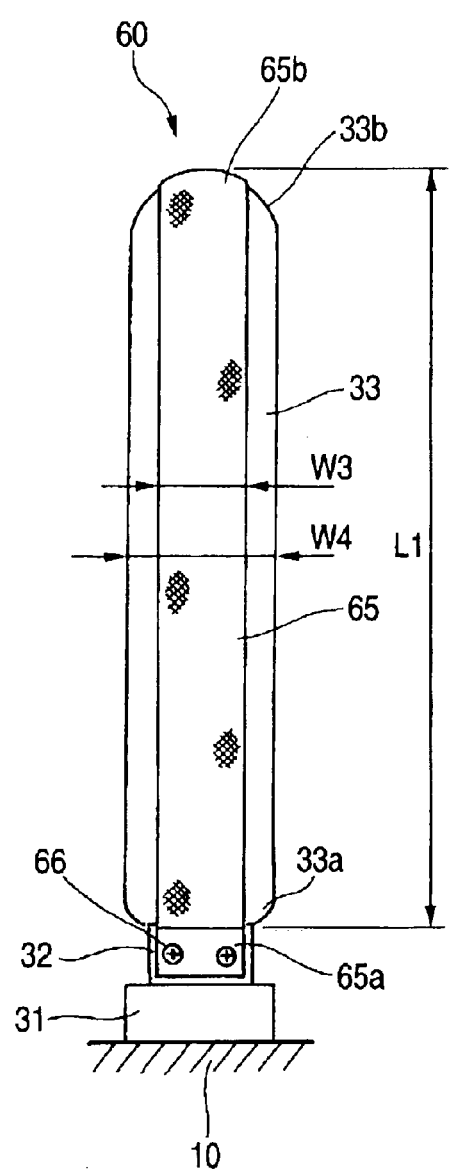

FIGS. 6A, 6B are side views showing other embodiments of automotive outboard air bag systems according to the invention, and FIG. 6A shows the second embodiment, whereas FIG. 6B shows the third embodiment.

Like reference numerals are imparted to members of the second and third embodiments which are like to those of the first embodiment, and the description thereof will be omitted.

An automotive outboard air bag system 50 according to the second embodiment shown in FIG. 6A is constructed such that two straps 55 are prepared, lower end portions 55a, 55a of the respective straps 55, 55 are disposed at a certain interval on a lower end portion 33a side of an air bag 33 or left and right ends of the an inflator 32, the lower end portions 55a, 55a so disposed are then attached to the inflator 32 with rivets 56, 56, respectively, upper end portions 55b, 55b of the respective strap 55, 55 are overlapped together on an upper end portion 33b of the air bag 55 for disposition thereat, and the upper end portions 55b, 55b are sutured to the upper end portion 33b of the air bag 33, the remaining construction of the automotive outboard air bag system according to the second embodiment is the same as that of the first embodiment.

By spacing away the lower end portions 55a of the pair of straps 55 from each other at the certain interval and overlapping the upper end portions 55b thereof each other, the pair of straps 55 are provided to extend from the upper end portion 33b to the lower end portion 33a of the air bag 33 in such a manner as to be disposed in substantially an inverted V-shape.

The strap 55 is a flexible belt-like strap which is similar to the strap 35 described in the first embodiment and is set to have a strap width W2 and a strap length L1.

The strap width W2 of the strap 55 may be the same as the strap width W1 of the first embodiment or may be narrower than the strap width W1.

As with the first embodiment, the strap 55 is set to be shorter than the overall length L2 of the air bag 33 and is disposed so as to face the outer surface 18b of the front pillar 18 and the outer surface 12b (refer to FIG. 1) of the windshield 12.

According to the second embodiment, by extending the straps 55, 55 which are shorter than the overall length L2 of the air bag 33 from the upper end portion 33b to the lower end portion 33a of the air bag 33, when the air bag 33 is inflated to deploy, the inflation and deployment of the air bag 33 can be restrained by the straps 55, 55, thereby making it possible to provide a similar advantage to that provided by the first embodiment that the air bag 33 is bent in a curved fashion.

Furthermore, by making the straps 55, 55 face the outer surface 18b (refer to FIG. 1) of the front pillar 18, the air bag 33 can be bent in the curved fashion so as to approach the outer surface 18b of the front pillar 18.

Thus, there can be obtained a similar advantage to that of the first embodiment that the air bag 33 is inflated to deploy along the outer surface of the vehicle 10 (refer to FIG. 1), in particular, along the outer surface 18b of the front pillar 18 and the outer surface 12b of the windshield 12.

In addition, by spacing away the lower end portions 55a of the pair of straps 55 from each other at the certain interval so that the pair of straps 55 can be disposed in substantially the inverted V-shape, the restraint of the lower end portions 33a of the air bag 33 can be strengthened.

Thus, the maintaining properties for maintaining the posture of the air bag 33 in a regular condition when the air bag 33 is inflated to deploy can further be enhanced.

An automotive outboard air bag system 60 according to the third embodiment shown in FIG. 6B is constructed such that a strap 65 is set to have a strap width W3, a lower end portion 65a of the strap 65 is attached to a lower end portion 33a side of an air bag 33 or an inflator 32 with rivets 66, 66, and an upper end portion 65a of the strap 65 is sutured to an upper end portion 33b of the air bag 33, whereby the strap is allowed to extend from the upper end portion 33b to the lower end portion 33a of the air bag 33, the remaining construction of the automotive outboard air bag system of the third embodiment is the same as that of the first embodiment.

The strap 65 is, for example, a flexible belt-like strap similar to the strap 35 which is described in the first embodiment and is set to have the strap width W3 and a strap length L1.

The strap width W3 is set to be wide enough to approach an air bag width W4 set for the air bag 33.

Furthermore, as with the first embodiment, the strap 65 is set to be shorter than the overall length L2 of the air bag 33 and is disposed so as to face the outer surface 18b of the front pillar 18 and the outer surface 12b of the windshield 12 (refer to FIG. 1).

According to the third embodiment, by allowing the strap 65 which is shorter than the overall length L2 of the air bag 33 to extend from the upper end portion 33b to the lower end portion 33a of the air bag 33, when the air bag 33 is inflated to deploy, the inflation and deployment of the air bag 33 is restrained by the strap 65, whereby there can be obtained an advantage similar to that provided by the first embodiment that the air bag 33 can be bent in a curved fashion.

Moreover, by allowing the strap 65 to face the outer surface 18b of the front pillar 18 (refer to FIG. 1), the air bag 33 can be bent in the curved fashion so as to approach the outer surface 18b of the front pillar 18 and the outer surface 12b of the windshield 12.

Thus, there can be obtained an advantage similar to that provided by the first embodiment that the air bag 33 is inflated to deploy along the outer surface of the vehicle (refer to FIG. 1), in particular, along the outer surface 18b of the front pillar 18 and the outer surface 12b of the windshield 12.

In addition, by setting the strap width W3 to be wide enough to approach the air bag width W4, left and right side portions of the upper end portion 33b of the air bag 33 can be extended uniformly.

According to this construction, when the air bag 33 is inflated to deploy, twisting of the air bag 33 is prevented, whereby the maintaining properties that the posture of the air bag 33 is maintained in the regular condition can further be enhanced.

Note that while the first embodiment is described as the example in which the lower end portion 35a of the strap 33 is attached to the inflator 39 via the rivet 39 and the upper end portion 35b of the strap 35 is sutured to the upper end portion 33b of the air bag 33, the means for attaching the strap 35 to the lower end portion 33a and the upper portion 33b of the air bag 33 is not limited thereto, and therefore, any other connecting and attaching means may be used to attach the strap 35 to the lower end portion 33a side and the upper end portion 33b of the air bag 33.

In addition, while the first embodiment is described as the example in which the lower end portion 35a of the strap 35 is attached to the inflator 32, as another example, the lower end portion 35a of the strap 35 can be attached to the lower end portion 33a of the air bag 33.

While only certain embodiments of the invention have been specifically described herein, it will apparent that numerous modifications may be made thereto without departing the spirit and scope of the invention.

Being constructed as has been described heretofore, the invention can provide the following advantages.

According to the aspect of the invention, since the strap which is shorter than the overall length of the air bag is allowed to extend from the upper end to the lower end of the air bag, when the air bag is inflated to deploy the inflation and deployment of the air bag is restrained by the strap, whereby the air bag can be bent in the curved fashion.

In addition, since the strap is allowed to face the outer surface of the front pillar, the air bag can be bent in the curved fashion so as to approach the outer surface of the front pillar.

Consequently, since the air bag can be inflated to deploy along the front pillar, an impact exerted on a colliding object can efficiently be absorbed by the air bag so inflated and deployed.

What is claimed is:

1. An automotive outboard air bag system comprising:
    an elongate tubular air bag operable to be inflated to deploy upwardly from the vicinity of a lower end portion of a front pillar along an outer surface of the front pillar; and
    a strap being shorter than the overall length of the air bag and extending from an upper end to a lower end of the air bag in such a manner as to face the outer surface of the front pillar.

2. The automotive outboard air bag system according to claim 1, wherein the air bag and the strap are received within a cowl formed in the vicinity of the lower end portion of the front pillar, and the strap is disposed closed to the front pillar with respect to the air bag.

3. An automotive outboard air bag system comprising:
    an air bag operable to be inflated to deploy upwardly from the vicinity of a lower end portion of a window glass front pillar along an outer surface of a window glass; and
    a strap being shorter than the overall length of the air bag and extending from an upper end to a lower end of the air bag in such a manner as to face the outer surface of the window glass when the air bag is inflated to deploy.

4. The automotive outboard air bag system according to claim 3, wherein the window glass is a windshield.

5. The automotive outboard air bag system according to claim 3, wherein the air bag and the strap are received within a cowl formed in the vicinity of the lower end portion of the window glass, and the strap is disposed close to the window glass front pillar, with respect to the air bag.

6. The automotive outboard air bag system according to claim 1 wherein the air bag is deployed in a curved fashion so as to approach the outer surface of the front pillar.

7. The automotive outboard air bag system according to claim 1 wherein the strap is deployed between the air bag and the front pillar.

8. The automotive outboard air bag system according to claim 1 wherein the strap comprises two straps disposed at an interval on the lower end of the air bag and overlap together at the upper end of the air bag.

* * * * *